(No Model.)

J. W. & H. COX.
SLEIGH.

No. 388,534. Patented Aug. 28, 1888.

Witnesses:
C. M. Stiles.
R. H. Orwig.

Inventors:
John W. Cox and Henry Cox,
By Thomas G. Orwig, Attorney.

N. PETERS, Photo-Lithographer, Washington, D. C.

UNITED STATES PATENT OFFICE.

JOHN W. COX AND HENRY COX, OF EARLHAM, IOWA.

SLEIGH.

SPECIFICATION forming part of Letters Patent No. 388,534, dated August 28, 1888.

Application filed February 4, 1888. Serial No. 263,016. (No model.)

*To all whom it may concern:*

Be it known that we, JOHN W. COX and HENRY COX, citizens of the United States of America, and residents of Earlham, in the county of Madison and State of Iowa, have invented a Flexible Sleigh Attachment for Wheeled Vehicles, of which the following is a specification.

Our object is to furnish a neat, strong, durable, and flexible sleigh, adapted to be readily substituted for the axles and wheels of a wagon in such a manner that each runner will have independent vertical-play, as required to pass over obstructions and uneven surface without the jarring and damaging incident to rigidly-fixed runners.

Our invention consists in the construction and combination of runners and braces with tubular axles and the fifth-wheel and bolster of a wagon, as hereinafter set forth, pointed out in our claims, and illustrated in the accompanying drawings, in which—

Figure 1:
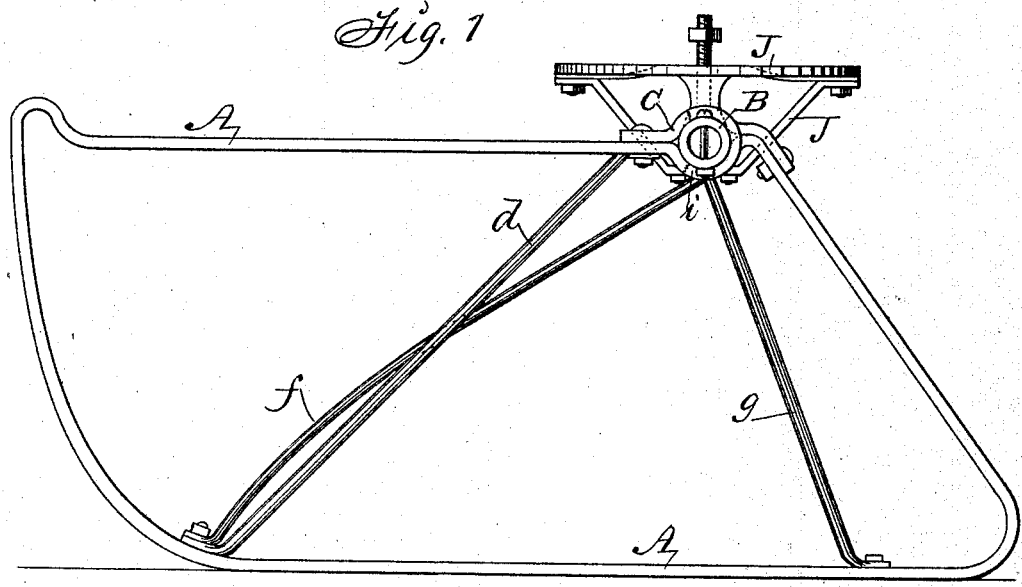
Figure 2:
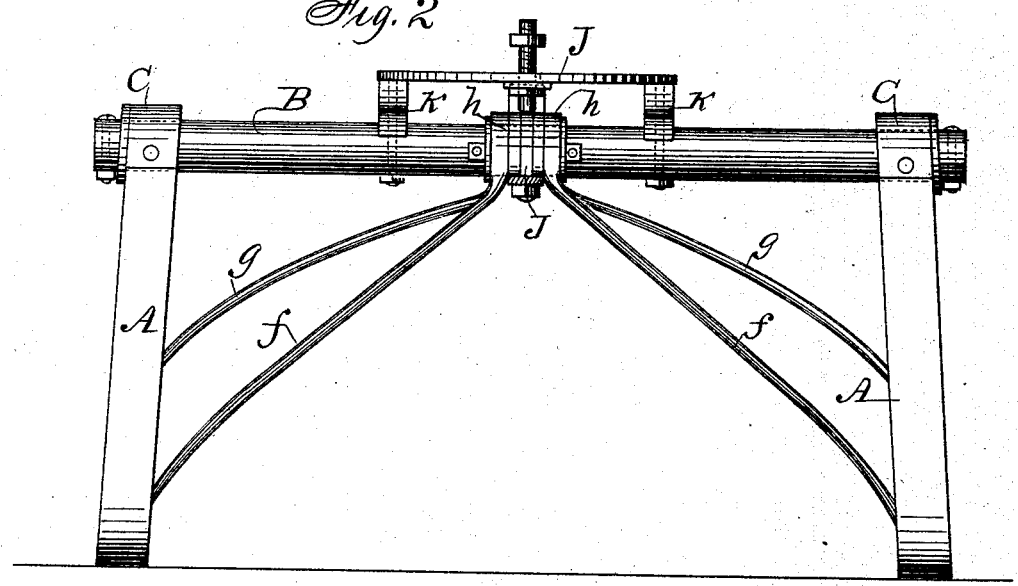

Figure 1 is a side view, and Fig. 2 a front view, of one of our flexible sleigh attachments ready to be applied to the body of a wheeled vehicle or the box of a common farm-wagon.

A represents a runner made by bending a single bar of iron or steel into the shape shown, so its ends will overlap, preferably at the rear and top corner, to be welded or bolted together. A semicircular downward bend near the rear top corner of the runner serves as a bearing for an axle, B, preferably made of a straight piece of metal tubing. Metal caps C are bolted to the runners to form complete bearings, through which the axles can be passed and secured by means of washers and bolts, as clearly shown in Fig. 2.

$d$ is a metal rod and brace that extends diagonally from the front and bottom of each runner to the top and rear portion, and is rigidly secured thereto by means of bolts.

$f$ is a rod and brace that is fixed to the front and lower portion of the runner, and $g$ is a corresponding rod fixed to the rear and lower portion of the same runner. These two braces converge and are united at their top ends to jointly terminate in an eye, $h$, adapted to admit the axle B.

J is a frame fitted and fixed to the center of the axle B in such a manner that it will when connected with the body of a buggy, carriage, or a rigid box prevent the axle from revolving in its bearings and allow the runners to turn on the same axle. The top of the frame J is circular, to correspond with the fifth-wheel of a vehicle, and adapted to serve as the lower half of a fifth-wheel.

$k$ $k$ are blocks fixed to the axle B and the opposite sides of the frame J by means of bolts, as clearly shown in Fig. 2, to rigidly connect and support the elevated top of the frame.

In connecting the runners and axle and frame the frame is first fixed to the center of the axle and the opposite ends of the axle then passed through the eyes $h$ of the braces and the bearings in the runners before the blocks $k$ are fixed in place, and washers secured to the axle at the opposite sides of the frame J and eyes $h$, and to the ends of the axle by means of bolts passed through the axle, or in any suitable way. To connect our flexible sleigh with a vehicle, we detach the axles and wheels and bolt the frame J to the fifth-wheel of a front carriage and the frame of another flexible sleigh to the bolster of a rear carriage, or both frames of the two sleighs to the cross-pieces of a rigid box.

We claim as our invention—

1. A sleigh-runner and attachment composed of a bent bar, A, a brace, $d$, and rods $f$ and $g$, terminating in an eye, $h$, and a cap, C, in combination with an axle, B, substantially as shown and described, for the purposes stated.

2. The combination of the bent bar A, the cap C, the brace $d$, and the braces $f$ and $g$, united at their top ends and terminating in an eye, $h$, for the purposes stated.

3. The flexible sleigh comprising the runners A, braces $d$, $f$, and $g$, an eye, $h$, at the ends of said braces $f$ and $g$, a frame, J, an axle, B, caps C, blocks $k$, and washers and bolts, constructed, arranged, and combined substantially as and for the purposes stated.

JOHN W. COX.
HENRY COX.

Witnesses:
RILEY EDWARDS,
J. Q. MORSE.